United States Patent [19]

Craig

[11] Patent Number: 6,136,078
[45] Date of Patent: Oct. 24, 2000

[54] MARKING COMPOSITION AND METHOD FOR MARKING DARK SUBSTRATES

[75] Inventor: Michael S. Craig, Easton, Pa.

[73] Assignee: Binney & Smith Inc., Easton, Pa.

[21] Appl. No.: 09/252,612

[22] Filed: Feb. 5, 1999

[51] Int. Cl.$^7$ .................................................. C09D 13/00
[52] U.S. Cl. ..................................... 106/31.08; 106/31.29; 106/31.11
[58] Field of Search .............................. 106/31.08, 31.11, 106/31.29, 31.61

[56] References Cited

U.S. PATENT DOCUMENTS

| | | | |
|---|---|---|---|
| 394,937 | 12/1888 | Requa . | |
| 919,410 | 4/1909 | Wild, Jr. . | |
| 2,650,195 | 8/1953 | Cardwell et al. | 252/8.5 |
| 3,933,708 | 1/1976 | Brinkman | 260/23 H |
| 4,229,334 | 10/1980 | Klabacka et al. | 260/28.5 A |
| 4,978,390 | 12/1990 | Snedeker | 106/19 |
| 5,055,498 | 10/1991 | Brachman | 523/164 |
| 5,261,952 | 11/1993 | Craig | 106/19 B |
| 5,383,954 | 1/1995 | Craig | 106/19 B |
| 5,449,399 | 9/1995 | Tsuei et al. | 106/31.08 |
| 5,529,615 | 6/1996 | Rendino et al. | 106/19 B |
| 5,621,022 | 4/1997 | Jaeger et al. | 106/31.29 |

*Primary Examiner*—Mark L. Bell
*Assistant Examiner*—Veronica F. Faison
*Attorney, Agent, or Firm*—Leydig, Voit & Mayer, Ltd.

[57] ABSTRACT

A marking composition suitable for marking colored substrates, especially dark substrates, is disclosed. The marking composition comprises a wax, a fatty acid, a reflecting filler, and a colorant selected from an oil soluble dye, an oil dispersable dye, or an oil dispersable pigment. A defoamer and a non-reflecting filler can be optionally included in the marking composition. For example, the marking composition can be provided in the form of crayons, colored pencils, and the like. A method of providing a mark on a colored substrate is also disclosed.

19 Claims, No Drawings

MARKING COMPOSITION AND METHOD FOR MARKING DARK SUBSTRATES

TECHNICAL FIELD OF THE INVENTION

The present invention pertains generally to marking or coloring materials. In particular, the present invention relates to marking compositions and methods, as might be particularly useful for marking colored substrates, especially dark substrates.

BACKGROUND OF THE INVENTION

It is well known in the art that solid marking compositions can be formulated from mixtures of waxes, fatty acids, colorants, and color extenders. These solid marking compositions can be used to fabricate crayons (e.g., by low pressure injection molding or gravity pour molding), which can be used to draw, write, or color on porous and non-porous substrates. Crayons are most often used on various types of paper, such as notebook paper, art paper, and posterboard. Furthermore, crayons are available in a wide selection of colors, ranging from primary colors to fluorescent colors.

A variety of crayons and marking compositions have been disclosed in the patent literature. See, for example, U.S. Pat. Nos. 3,409,574; 3,933,708; 4,212,676; 4,990,013; and 5,383,954. However, these and other conventional approaches for providing crayons and marking compositions have been ill-suited for marking on colored substrates, especially dark substrates. In this respect, upon application to colored substrates, especially dark substrates, crayons and marking compositions of the prior art generate marks that are dull and that are not bright or vivid enough to be readily seen against such dark backgrounds.

Accordingly, it will be appreciated that there exists a need for a marking composition and method that permits the formation of bright and vivid marks on dark substrates. Particularly, there exists a need for a marking composition and method that not only produces bright and vivid marks on dark substrates, but which is also non-toxic, simple to make and use, chemically stable, and capable of generating various colors. It is an object of the present invention to provide a marking composition and method that satisfies these needs. These and other objects and advantages of the present invention, as well as additional inventive features, will be apparent from the description of the invention provided herein.

BRIEF SUMMARY OF THE INVENTION

The present invention provides a marking composition suitable for marking on colored substrates (such as dark substrates) that comprises a wax, a fatty acid, a reflecting filler (i.e., opacifier), which is desirably present in a concentration of at least about 5% by weight of said composition, and a colorant selected from oil soluble dyes, oil dispersable dyes, or oil dispersable pigments. Preferably, the colorant is an oil soluble or dispersable dye. More preferably, the colorant is a polymer-bound oil soluble or dispersable dye, such as, for example, a polyoxyalkylene substituted chromophore. The inventive marking composition is suitable for use in writing instruments. In particular, the composition is especially suitable for use in crayons.

Advantageously, upon application to dark substrates, the marking composition of the present invention forms much brighter and more vivid and intense marks than conventional marking compositions. In addition, the inventive marking composition is non-toxic, simple to make and use, chemically stable, and capable of generating various colors.

DETAILED DESCRIPTION

The present invention is predicated, at least in part, on combining an oil soluble or dispersable dye, or oil dispersable pigment, with a reflecting filler in a marking composition, and especially, a solid marking composition. Particularly, the reflecting filler desirably is present in a concentration of at least about 5% by weight of said composition. The colorant is preferably a polymer-bound oil soluble or dispersable dye. In addition, the marking composition comprises a wax and a fatty acid, and, optionally, a non-reflecting filler and a defoamer. By way of example, the marking composition can be in the form of a writing instrument, such as, but not limited to, a crayon or a colored pencil.

In particular, the marking composition of the present invention has particular utility with respect to marking colored substrates, and especially, dark substrates. In this respect, the inventive marking composition can be applied to any suitable substrate (dark or otherwise). Strictly by way of example, and not limitation, the colored and/or dark substrate can be in the form of notebook paper, art paper, posterboard, cardboard, construction paper, toys, paper bags (e.g., kraft paper bags), and the like.

In accordance with the present invention, the marking composition comprises a reflective filler (i.e., an opacifier), which is desirably provided in a concentration of at least about 5% by weight of the composition, and more preferably, about 8% to about 10% by weight of the composition. Significantly, the reflective filler enhances the opacity and, hence, brightness of the inventive marking composition. In this respect, the enhanced opacity provided in the form of the reflective filler causes more light to be reflected off of marks produced by the inventive composition, such that the marks will appear brighter and more vivid when applied to a dark substrate. Any suitable reflective filler can be utilized. However, an especially preferred reflective filler for inclusion in the marking composition of the present invention is titanium dioxide ($TiO_2$) because it is very compatible with wax-fatty acid systems (as used herein), such as paraffin-stearic systems, and it has high opacity and whiteness. For example, $TiO_2$ is more desirable than zinc oxide because zinc oxide is not compatible with the rest of the formulation. For example, zinc oxide reacts with stearic acid undesirably to form zinc stearate.

The dye utilized in the inventive marking composition is either soluble in oil or dispersable (e.g., in the form of an emulsion) in oil as is desirable for the present wax-fatty acid system. The oil soluble or dispersable dye can be provided in any suitable amount. For example, the oil soluble or dispersable dye can be present in an amount ranging from about 1% to about 7% by weight of the inventive composition, more preferably about 5% by weight of said composition. Any oil soluble or dispersable dye can be utilized. The oil soluble or dispersable dye is preferably in liquid form, although dyes in dry (e.g., powder) form can also be incorporated into the inventive composition. The marking composition of the present invention avoids the need for including an emollient, especially where liquid dyes are utilized.

Preferably, the oil soluble or dispersable dye comprises a polymer-bound oil soluble or dispersable dye, such as a polyoxyalkylene substituted chromophore, and the dye can be encapsulated, if desired. Polymer-bound oil soluble or dispersable dyes are especially desirable because of their enhanced transparency and lightfastness. In this respect, such dyes that exhibit enhanced transparency are desirable, in accordance with the present invention, because the color of the dye is readily observed, but the relative transparency of the dye optimizes the reflective effect of the reflective filler so that the marking composition can produce bright and vivid marks on a dark substrate. Accordingly, oil soluble or dispersable dyes are strongly preferred over pigments because pigments are generally not as transparent for use in the present invention, and, in some embodiments, the pigment may even reduce the desired brightness and intensity effect desired pursuant to the present invention.

For example, various POLYTINT™ dyes (commercially available from Milliken Chemical Company of Spartanburg, S.C.) are polymer-bound oil soluble or dispersable dyes that are particularly useful dyes in the context of the marking composition of the present invention. Examples of suitable POLYTINT™ dyes include, for example, POLYTINT™ yellow X15, POLYTIN™ red X64, POLYTINT™ orange X96, POLYTINT™ blue X3LV, POLYTINT™ black X41LV, POLYTINT™ violet X80LT, and combinations thereof. The POLYTINT™ dyes can be blended to form alternative colors (e.g., POLYTINT™ blue can be blended with POLYTINT™ yellow to form a green dye). In the case of dye blends, the total amount of dye still desirably makes up about 1% to about 7% by weight of the inventive composition.

The wax can be any suitable material and, for purposes of the present invention, preferably will generally comprise one or more paraffin waxes, microcrystalline waxes, synthetic waxes, and natural waxes, as well as vegetable fats and hydrogenated and sulfonated derivatives thereof, animal fats and hydrogenated derivatives thereof, fatty esters of glycols, fatty acid salts of alkali and alkaline earth metals and aluminum, and any combination thereof. The wax is preferably paraffin wax alone, although paraffin wax can be optionally used in combination with other waxes, such as microcrystalline wax. The wax can be provided in any suitable amount. For example, the wax can be provided in a concentration of about 1% to about 60% by weight of the composition, preferably about 40% to about 55% by weight of the composition. The wax is included in the marking composition of the present invention as a plasticizer.

The fatty acid may be a saturated fatty acid, an unsaturated fatty acid, or a mixture of fatty acids. It is preferred that the fatty acid is one that adds strength to the composition and has from about 14 to 18 carbon atoms. Suitable fatty acids include lauric acid, myristic acid, palmitic acid, stearic acid, and mixtures thereof. Stearic acid is the most preferable fatty acid in the context of the present invention. For example, if desired, stearic acid can be mixed with another fatty acid (e.g., palmitic acid). The fatty acid can be provided in any suitable amount. For example, the fatty acid can be provided in an amount ranging from about 1% to about 40% by weight of the composition, preferably in an amount ranging from about 20% to about 30% by weight of the composition.

The wax and fatty acid together form a waxy material. The waxy material exhibits sufficient hardness to be handled, while also being soft enough that abrasion of the material at reasonable pressure against a substrate will result in the material adhering to the substrate. In particular, if the waxy material is too hard, the payoff (i.e., the amount transferred to the substrate) would be undesirably low. On the other hand, if the waxy material is too hard, the stability, strength, and melting point would all be problematic. Accordingly, the melting point of the wax preferably ranges from about 137° F. to about 157° F., more preferably, about 147° F. Meanwhile, the fatty acid preferably has a melting point that ranges from about 120° F. to about 140° F., more preferably, about 130° F.

In addition, the marking composition can optionally include a non-reflective filler and a defoamer. The non-reflective filler is distinguishable from the reflective filler since the non-reflective filler does not provide opacity to enhance the intensity or brightness of marks formed by the inventive composition on dark substrates. The non-reflective filler can be included, if desired, to enhance the strength of the inventive marking composition.

Any suitable non-reflective filler can be included in the marking composition of the present invention. For example, suitable non-reflecting fillers include calcium carbonate, talc, silica, clay (e.g., kaolin clay), feldspar, corn starch, mica, and mixtures thereof. A preferred non-reflective filler is talc or clay although talc is even more desirable than clay. For example, talc tends to be softer than clay, thereby enhancing laydown. In addition, talc is desirably whiter than clay, which promotes the appearance of marks on dark substrates, in accordance with the present invention. The non-reflective filler can be provided in any suitable amount. For example, if present, the non-reflective filler can be provided in an amount ranging from about 0.1% to about 15% by weight of the composition, preferably about 12%, although the non-reflective filler can be excluded altogether.

The defoamer is also optionally present in the marking composition of the present invention and is particularly helpful for minimizing or removing entrapped air that may be incorporated into the batch during the mixing and molding process. Otherwise, air is generally more likely to be present and remain in the batch, as compared with conventional marking compositions (e.g., conventional crayons), because the inventive compositions tend to have a higher viscosity. Any suitable defoamer can be utilized in the marking composition of the present invention. Examples of suitable defoamers include, but are not limited to, siloxanes, petroleum hydrocarbons, and cetyl dimethicones (commercially available as ABIL wax 9840 from Goldschmidt Chemical Corp. of Hopewell, Va.). The defoamer can be included in any suitable amount, preferably in an amount ranging from about 0.1% to about 1% by weight of the composition, although the defoamer can be left out altogether.

The following example further illustrates the present invention, but, of course, should not be construed as in any way limiting its scope. Quantities are in percent by weight of the total composition.

EXAMPLE I

A marking composition was prepared such that it contained approximately 48 wt. % paraffin wax, 26 wt. % stearic acid, 12.3 wt. % talc, 5 wt. % of a Milliken POLYTINT™ violet X80LT liquid dye, 8.4 wt. % $TiO_2$, and 0.25 wt. % ABIL wax 9840 (defoamer). This marking composition was prepared by low pressure gravity molding into the form of a crayon. Additional crayons of various colors were produced in the same manner and same relative proportions, except that the particular Milliken POLYTINT™ liquid dye (or dyes, in the case of blends) varied depending upon the desired color for the crayon. Specifically, additional crayons were made by using POLYTINT™ yellow X15, as well as a red-violet crayon, wherein the dye component included a blend of POLYTINT™ red and POLYTINT™ violet. In the case of the latter dye blend, the cumulative amount of dye still amounted to 5 wt. % of the marking composition.

Upon application to black construction paper, each crayon exhibited a bright, vivid mark on the black construction paper. For purposes of comparison, conventional crayons (i.e., not encompassing a marking composition of the present invention) of the same colors (i.e., yellow, violet, and red-violet) were also applied to the same black construction paper. The conventional crayons produced marks that were not nearly as bright and vivid as the crayons encompassing the inventive marking compositions in a side-by-side evaluation on the black construction paper.

While this invention has been described with an emphasis upon certain preferred embodiments, it will be apparent to those of ordinary skill in the art that variations in the preferred compositions and methods may be used and that it is intended that the invention may be practiced otherwise than as specifically described herein. Accordingly, this invention includes all modifications encompassed within the spirit and scope of the invention as defined by the following claims.

What is claimed is:

1. A marking composition suitable for marking colored substrates comprising:
    a wax;
    a fatty acid;
    a reflecting filler, which is present in a concentration of at least about 5% by weight of said composition; and
    a colorant selected from the group consisting of an oil soluble dye and an oil dispersable dye.

2. The marking composition of claim 1, wherein said colorant comprises an oil soluble or dispersable dye selected from the group consisting of polymer-bound oil soluble or dispersable dyes.

3. The marking composition of claim 2, wherein said polymer-bound oil soluble or dispersable dye is a polyoxyalkylene substituted chromophore.

4. The marking composition of claim 2, wherein said polymer-bound oil soluble dye is encapsulated.

5. The marking composition of claim 1, wherein said reflecting filler is titanium dioxide.

6. The marking composition of claim 1, wherein said wax is paraffin wax.

7. The marking composition of claim 1, wherein said fatty acid is stearic acid.

8. The marking composition of claim 1, further comprising a non-reflective filler.

9. The marking composition of claim 8, wherein said non-reflective filler is talc.

10. The marking composition of claim 1, further comprising a defoamer, which is present in a concentration ranging from about 0.1% to about 1% by weight of said composition.

11. The marking composition of claim 1, wherein said reflecting filler is titanium dioxide which is present in a concentration of from about 5% to about 12% by weight of said composition, and wherein said colorant is an oil soluble or dispersable dye selected from the group consisting of polyoxyalkylene substituted chromophores, which is present in a concentration of from about 1% to about 7% by weight of said composition.

12. The marking composition of claim 11, wherein said titanium dioxide is present in a concentration of about 8.4% by weight of said composition, and wherein said polyoxyalkylene substituted chromophore is present in a concentration of about 5% by weight of said composition.

13. The marking composition of claim 11, wherein said wax is paraffin wax, which is present in a concentration of from about 1% to about and 60% by weight of said composition, and wherein said fatty acid is stearic acid, which is present in a concentration of from about 1% to about 40% by weight of said composition.

14. The marking composition of claim 13, wherein said paraffin wax is present in a concentration of about 48% by weight of said composition, and wherein said stearic acid is present in a concentration of about 26% by weight of said composition.

15. The marking composition of claim 13, further comprising a non-reflective filler which is present in a concentration ranging from about 0.1% to about 15% by weight of said composition.

16. A crayon composition suitable for marking dark colored substrates comprising:
    a wax, which is present in a concentration of from about 1% to about 60% by weight of said composition;
    a fatty acid, which is present in a concentration of from about 1% to about 40% by weight of said composition;
    a reflecting filler, which is present in a concentration ranging from about 5% to about 12% by weight of said composition;
    a polymer-bound oil soluble dye, which is present in a concentration ranging from about 1% to about 7% by weight of said composition;
    a defoamer which is optionally present in a concentration ranging from about 0% to about 1% weight of said composition; and
    a non-reflective filler, which is optionally present in a concentration ranging from about 0% to about 15% by weight of said composition.

17. The crayon composition of claim 16, wherein said wax is paraffin, which is present in a concentration of about 48% by weight of said composition; wherein said fatty acid is stearic acid, which is present in a concentration of about 26% by weight of said composition; wherein said reflecting filler is titanium dioxide, which is present in a concentration of about 8.4% by weight of said composition; wherein said polymer-bound oil soluble dye is a polyoxyalkylene substituted chromophore, which is present in a concentration of about 5% by weight of said composition; wherein said defoamer is present in a concentration of about 0.25% by weight of said composition; and wherein said non-reflective filler is talc, which is present in a concentration of about 12.3% by weight of said composition.

18. A method of providing a mark on a colored substrate comprising:
    applying to said substrate a marking composition comprising a wax, a fatty acid, a reflecting filler, a polymer-bound oil soluble or dispersable dye, an optional defoamer, and an optional non-reflecting filler.

19. The method of claim 18, wherein said substrate is selected from the group consisting of notebook paper, art paper, posterboard, cardboard, construction paper, paper bags and toys.

* * * * *